June 22, 1926.

W. A. VALENTINE, SR

BALANCE LEVEL

Filed Feb. 19, 1925

1,590,136

WITNESSES

INVENTOR
W. A. Valentine Sr.
BY
ATTORNEYS

Patented June 22, 1926.

1,590,136

UNITED STATES PATENT OFFICE.

WILLIAM A. VALENTINE, SR., OF EAST ORANGE, NEW JERSEY.

BALANCE LEVEL.

Application filed February 19, 1925. Serial No. 10,399.

This invention relates to levels used by carpenters and other workmen and has for an object to provide an improved construction wherein not only the horizontal and vertical may be ascertained but substantially any angle from a horizontal.

Another object of the invention is to provide a level wherein a weighted pointer is provided, the arrangement being such that a plurality of projections are presented and associated with a specially prepared dial for indicating at two points the angle of the level.

A further object of the invention, more specifically, is to provide a balance level wherein a swinging pointer is provided and means for mounting the same provided with an adjusting structure to accurately adjust the parts so that the pointer will always accurately indicate the correct angle of the level.

In the accompanying drawing—

Figure 2:
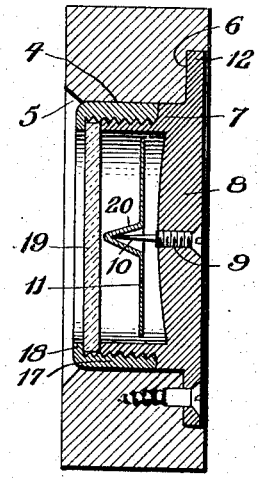
Figure 2 is a sectional view through Figure 1, approximately on line 2—2.
Figure 3:
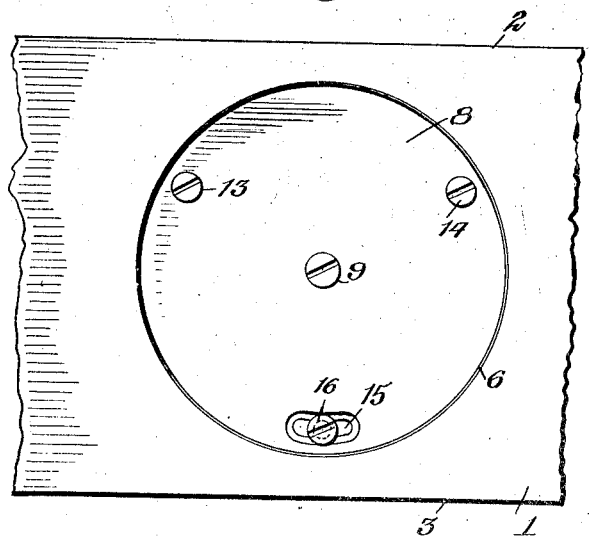
Figure 3 is a rear view of the structure shown in Figure 1.
Figure 4:
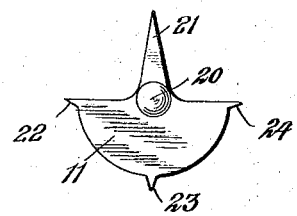
Figure 4 is a front view of the pointer shown in Figure 1.

Referring to the accompanying drawing by numerals, 1 indicates the body of the level which is provided with parallel straight edges 2 and 3. A bore 4 is provided in body 1, said bore having a flaring opening 5 on one face and an enlarged opening or recess 6 on the opposite face. Positioned in the bore 4 is what may be termed a casing 7, which casing is externally threaded for part of its depth and is provided with a comparatively thick bottom 8 accommodating the screw 9, which screw has a combined extension 10 acting as a pivotal pin for the pointer 11. The bottom 8 is provided with a flange 12, which flange is shown as provided with two apertures for accommodating the retaining screws 13 and 14 and an aperture or slot 15 for accommodating the retaining and adjusting screw 16. When the casing 7 is first mounted in the body 1, one of the screws 13 and 14 is first applied as shown in Figure 3, after which, the casing is swung on this screw until the pointer 11 is properly set, after which, screw 16 is tightened and then the other screw, as for instance, screw 14, is applied, whereby the casing is locked against accidental shifting. The sleeve 17 is screwed onto the threaded portion of casing 7, said sleeve having a turned over annular flange 18 whereby the protecting transparent member 19 is clamped in position as shown in Figure 2 in order to prevent dust and objectionable matter from entering casing 7 and interfering with the proper action of pointer 11. The pointer 11 is preferably made from metal which is comparatively thin and is formed with a hollow cone-shaped central projection 20 which accommodates the pin 10 whereby the pointer 11 may be free to move substantially in any direction and will, consequently, properly swing to indicate the angle of the body 1 at all times. The pointer 11 is provided with pointing fingers 21, 22, 23 and 24. It will be noted that fingers 21 and 23 are diametrically opposite and also fingers 22 and 24 are diametrically opposite.

Figure 1:
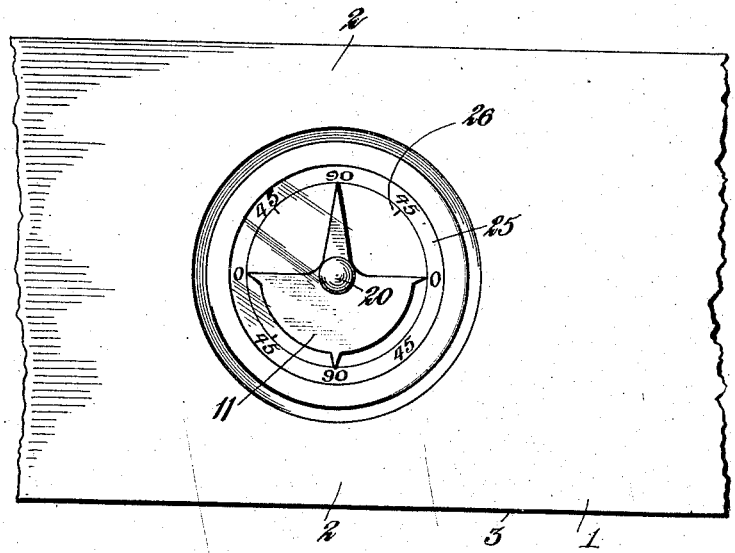
Figure 1 is a fragmentary side elevation of a level embodying the invention.

In order to secure the advantage of these various fingers, a dial 25 is applied to the inner surface of bottom 8 and is formed with various graduations 26 which show duplicate marking on diametrically opposite sides. As indicated in Figure 1, there are two numbers indicating ninety degrees, two numbers indicating forty-five degrees and two numbers indicating zero. It is, of course, evident that a greater or even less number of legends may be used without departing from the spirit of the invention and the diametrically opposite fingers caused to properly function therewith. As the pointer 11 is located in Figure 1, it would indicate that the surfaces 2 and 3 are exactly horizontal. If the level should be appreciably below the eye, the workman may readily look through glass 9 and observe the 90 which will indicate to him that the surfaces 2 and 3 are horizontal. If the level should be an appreciable distance above the head and it is necessary for the workman to look upwardly, the top 90 would be seen as well as certain other numbers. Where the level is to the right or left of the workman, he may look towards the pointer 11 and will see the graduations on scale 25 at the remotest point from him. This double marking on the dial 25 permits ready reading from different positions and does not, therefore, necessitate the workman to be directly in front of the pointer.

In forming the pointer 11, the lower part is made heavier than the upper part and as shown in the drawing this extra weight is provided by making the lower part solid. This will always cause the finger 21 to point upwardly and the fingers 22 and 24 to point horizontally. When the level is to be used, it is designed to be used in the ordinary manner of levels now on the market and instead of observing the bubble, the workman will notice the pointer 11 and in that way ascertain whether or not the parts are level or at the desired angle which could not be secured with the usual bubble level now in common use.

What I claim is:

A level, comprising a body, a casing removably mounted in the body, a dial carried by said casing, a pivotal pin extending from one part of the casing, a weighted pointer loosely mounted on said pin, said pointer being formed of sheet metal and having a centrally positioned cone with the open end positioned so that said pin will project into the cone for supporting the pointer, and a covering transparent panel carried by the casing positioned near the apex of the cone when the parts are in operative position whereby the pointer is permitted a free swinging movement but is prevented from moving off of said pin.

WILLIAM A. VALENTINE, Sr.